(12) United States Patent
Marchon

(10) Patent No.: US 6,208,489 B1
(45) Date of Patent: Mar. 27, 2001

(54) HEAD STACK-LEVEL LOAD/UNLOAD MECHANISM FOR RIGID DISK DRIVES

(75) Inventor: Bruno Jean Marchon, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/292,757

(22) Filed: Apr. 15, 1999

Related U.S. Application Data

(60) Provisional application No. 60/082,227, filed on Apr. 16, 1998.

(51) Int. Cl.[7] ............................... G11B 5/56; G11B 21/24
(52) U.S. Cl. ......................................... 360/294.7; 360/254
(58) Field of Search .................................. 360/250, 254, 360/254.3, 254.5, 294.7

(56) References Cited

U.S. PATENT DOCUMENTS

| | | | | |
|---|---|---|---|---|
| 3,180,944 | * | 4/1965 | Stover | 360/105 |
| 3,706,861 | * | 12/1972 | Giel | 360/103 |
| 3,939,495 | * | 2/1976 | Nagai et al. | 360/103 |
| 3,984,873 | | 10/1976 | Pejcha | 360/105 |
| 4,286,298 | * | 8/1981 | Rinkleib | 360/109 |
| 4,535,374 | | 8/1985 | Anderson et al. | 360/103 |
| 4,571,648 | * | 2/1986 | Barski | 360/105 |
| 4,605,979 | * | 8/1986 | Inoue et al. | 360/105 |
| 4,661,873 | * | 4/1987 | Schulze | 360/105 |
| 4,663,682 | | 5/1987 | McNeil | 360/105 |
| 4,814,907 | * | 3/1989 | Goor | 360/75 |
| 4,839,756 | * | 6/1989 | Chew et al. | 360/105 |
| 4,933,785 | | 6/1990 | Morehouse et al. | 360/78.04 |
| 4,954,904 | * | 9/1990 | Goor | 360/75 |
| 5,012,369 | * | 4/1991 | Owe et al. | 360/104 |
| 5,079,652 | * | 1/1992 | Ishida et al. | 360/75 |
| 5,082,827 | * | 1/1992 | Barnes | 505/171 |
| 5,223,993 | | 6/1993 | Squires et al. | 360/77.08 |
| 5,267,110 | | 11/1993 | Ottesen et al. | 360/106 |
| 5,289,325 | | 2/1994 | Morehouse et al. | 360/105 |
| 5,341,351 | | 8/1994 | Ng | 369/30 |
| 5,343,345 | | 8/1994 | Gilovich | 360/104 |
| 5,729,408 | * | 3/1998 | Kikitsu | 360/104 |
| 5,936,807 | * | 8/1999 | Fukawa et al. | 360/105 |

OTHER PUBLICATIONS

"An Experimental Study of the Parameters That Determine Slider–Disk Contacts During Dynamic Load–Unload," by T. G. Jeong and D. B. Bogy, STLE/ASME Tribology Conference, St. Louis, MO., Oct. 13–16, 1991, pp. 1–8.

\* cited by examiner

*Primary Examiner*—William Klimowicz
(74) *Attorney, Agent, or Firm*—Merchant & Gould P.C.

(57) ABSTRACT

A disk drive system is disclosed. The disk drive system includes at least one substantially flat magnetic disk, at least one read/write head, at least one head stack assembly, and at least one axial positioning device. Each head stack assembly is coupled to at least one read/write head, which is suspended in proximity to a magnetic disk for reading data from and writing data to the magnetic disk. Each axial positioning device is coupled to at least one head stack assembly for variably positioning the head stack assembly in a direction substantially normal to the disk surfaces. By axial positioning of the head stack assembly, each read/write head can be loaded onto a magnetic disk by being suspended in close proximity to the magnetic disk at the flying height of the read/write head, or unloaded from the magnetic disk by being suspended at a height in relation to the magnetic disk greater than the flying height.

20 Claims, 3 Drawing Sheets

HEAD STACK-LEVEL LOAD/UNLOAD MECHANISM FOR RIGID DISK DRIVES

CROSS-REFERENCE TO RELATED APPLICATIONS

Embodiments of this invention relate to Provisional Application Ser. No. 60/082,227, filed Apr. 16, 1998. The contents of that application are incorporated by reference herein.

BACKGROUND OF THE INVENTION

1. Field of the Invention

Embodiments of this invention relate generally to head stack assemblies for suspending and positioning read/write heads over magnetic media of the type generally used for storing digital data, and in particular embodiments to apparatus for non-frictional, head stack-level loading and unloading of read/write heads from the magnetic media, and systems incorporating the same.

2. Description of Related Art

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. To access memory locations on a hard disk, a read/write head is positioned slightly above the surface of the hard disk while the hard disk rotates beneath the read/write head at an essentially constant velocity. By moving the read/write head radially over the rotating hard disk, all memory locations on the hard disk can be accessed. The read/write head is typically referred to as "flying" head because it includes a slider aerodynamically configured to hover above the surface on an air bearing located between the hard disk and the slider that forms as the hard disk rotates at high speeds. The air bearing supports the read/write head above the disk surface at a height referred to as the "flying height."

In conventional disk drives, multiple hard disks are coupled to and rotate about a spindle, each hard disk presenting two substantially flat surfaces for reading and recording. Typically, multiple rotating hard disks are stacked in a parallel relationship with minimal spacing between them. Accordingly, the read/write heads must be designed to move within the narrow space between adjacent hard disks and fly close to the hard disk surfaces. To achieve this positional capability, the read/write heads in typical disk drives are coupled to the distal end of thin, arm-like structures called head suspension assemblies, which are inserted within the narrow space between adjacent hard disks. These head suspension assemblies are made of materials and thicknesses as to be somewhat flexible and allow a measure of vertical positioning as the read/write heads hover over the surface of the rotating hard disks.

Each head suspension assembly is coupled at its proximal end to a rigid actuator arm that horizontally positions the head suspension assembly and read/write head over the hard disk surface. In conventional disk drives, actuator arms are stacked, forming a multi-arm head stack assembly which moves as a unit under the influence of a voice coil motor to simultaneously position all head suspension assemblies and corresponding read/write heads over the hard disk surfaces.

In conventional disk drive systems, the hard disks rotate at high velocities and read/write heads are positioned over the hard disks with very little air gap separation, and read/write head contact with the hard disks (a head crash) can be catastrophic. Data can be permanently lost, or the read/write heads and hard disks can be damaged such that the entire disk drive system no longer functions. Therefore, modern disk drive systems avoid read/write head contact with the recording areas of hard disks as much as possible. To minimize read/write head contact with the recording areas of hard disks, many disk drives "park" their read/write heads when the disk drive system is powered down or when the hard disks temporarily stop spinning so that the read/write heads rest over parking zones (areas on the hard disks where no data is stored, typically the innermost central region of the disks or an area completely off of the disks). The use of parking zones minimize wear on the recording area of the disks and thus increases the reliability of the disk drive system and the integrity of the stored data.

However, head parking on the innermost region of the hard disk will cause wear on the read/write heads because the read/write heads eventually come into frictional contact with the parking zones as the hard disks stop spinning during a shutdown. This wear will also occur during disk drive startup, as the read/write heads will be in frictional contact with the parking zones until the hard disks have reached a speed sufficient to cause the "flying" of the heads. The problem of wear caused by these frictional start and stop processes is exacerbated by the increasing popularity of portable notebook computers, which require more frequent disk drive starts and stops to minimize power consumption.

Furthermore, the small geometries of modern disk drives makes the design of head parking areas on the innermost regions of hard disks problematic. Head parking areas on hard disks are typically roughened to minimize stiction and prevent the read/write heads from sticking to the disk surfaces. However, the flying height of modern read/write heads is so low that protrusions on surfaces roughened to minimize stiction may exceed the flying height of the read/write heads, making such parking areas effectively unusable for parking purposes.

Because of the problems inherent in head parking on the innermost region of the hard disk, head parking outside the outer diameter of the hard disk has become increasingly prevalent. In this method of head parking, no contact of the read/write heads with the disk surfaces is intended. During startup, the heads are brought in from a parking location off the outer diameter of the hard disk (unparked) and loaded onto the hard disk (placed above the spinning disks). During shutdown, the heads are unloaded (taken off the spinning hard disks) and moved to the parking location. In theory, an air bearing beneath the read/write heads and the spinning hard disks should prevent the read/write heads from touching the hard disks during both the loading and unloading processes. U.S. Pat. No. 5,289,325 (hereinafter the '325 patent) to Morehouse et al., incorporated herein by reference, discloses one method of head loading and unloading wherein the head suspension assemblies (but not the read/write heads themselves) frictionally contact ramps that lift the head suspension assemblies up off the disk surfaces during shutdown or lower the head suspension assemblies to just above the disk surfaces during startup.

However, loading and unloading of read/write heads using frictional contact, as in the Morehouse et al. patent, has its own share of problems. Upon startup, as the head suspension assemblies slide down and eventually slip off the ramps and onto the disk surfaces, the read/write heads may develop significant pitch and roll (non-parallel orientation with respect to the disk surface), causing edges of the read/write heads to contact disk surfaces despite the presence of an air bearing. In addition, manufacturing and assembly tolerances in the ramps and head suspension assemblies combined with frictional variations due to changing atmospheric conditions may cause the read/write heads to slide down the ramps at an improper loading velocity, resulting in read/write head contact with the disk surfaces. Furthermore, the frictional contact between the head suspension assemblies and the ramps will create, over time, wear debris detrimental to the integrity of the disk surfaces.

SUMMARY OF THE DISCLOSURE

Therefore, it is an object of embodiments of the invention to provide a system and apparatus for non-frictional, head stack-level loading and unloading of read/write heads from the magnetic media that reduces the likelihood of improper pitch and roll of the read/write heads, thereby reducing the likelihood of read/write head contact with the magnetic media surfaces.

It is a further object of embodiments of the invention to provide a system and apparatus for non-frictional, head stack-level loading and unloading of read/write heads from the magnetic media that reduces the likelihood of improper loading velocity, thereby reducing the likelihood of read/write head contact with the magnetic media surfaces.

It is a further object of embodiments of the invention to provide a system and apparatus for non-frictional, head stack-level loading and unloading of read/write heads from the magnetic media that eliminates the creation of wear debris detrimental to the integrity of the disk surfaces.

These and other objects are accomplished according to a disk drive system which includes at least one substantially flat magnetic disk, at least one read/write head, at least one head stack assembly, and at least one axial positioning device. Each head stack assembly is coupled to at least one read/write head, which is suspended in proximity to a magnetic disk for reading data from and writing data to the magnetic disk. Each axial positioning device is coupled to at least one head stack assembly for variably positioning the head stack assembly in a direction substantially normal to the disk surfaces. By axial positioning of the head stack assembly, each read/write head can be loaded onto a magnetic disk by being suspended in close proximity to the magnetic disk at the flying height of the read/write head, or unloaded from the magnetic disk by being suspended at a height in relation to the magnetic disk greater than the flying height.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Disk drives that read data from and write data to hard disks have become popular components of computer systems. To access memory locations on a hard disk, a read/write head is positioned slightly above the surface of the hard disk while the hard disk rotates beneath the read/write head at an essentially constant velocity. The read/write head is typically referred to as "flying" head because it includes a slider aerodynamically configured to hover above the surface on an air bearing located between the hard disk and the slider that forms as the hard disk rotates at high speeds.

To minimize read/write head contact with the data-carrying areas of hard disks, many disk drives unload and park their read/write heads when the disk drive system is powered down or when the hard disks temporarily stop spinning. The read/write heads are unparked and loaded back onto the hard disks when the disk drive system is activated again. The use of parking areas minimize wear on the recording area of the disks and thus increases the reliability of the disk drive system and the integrity of the stored data.

Figure 1:
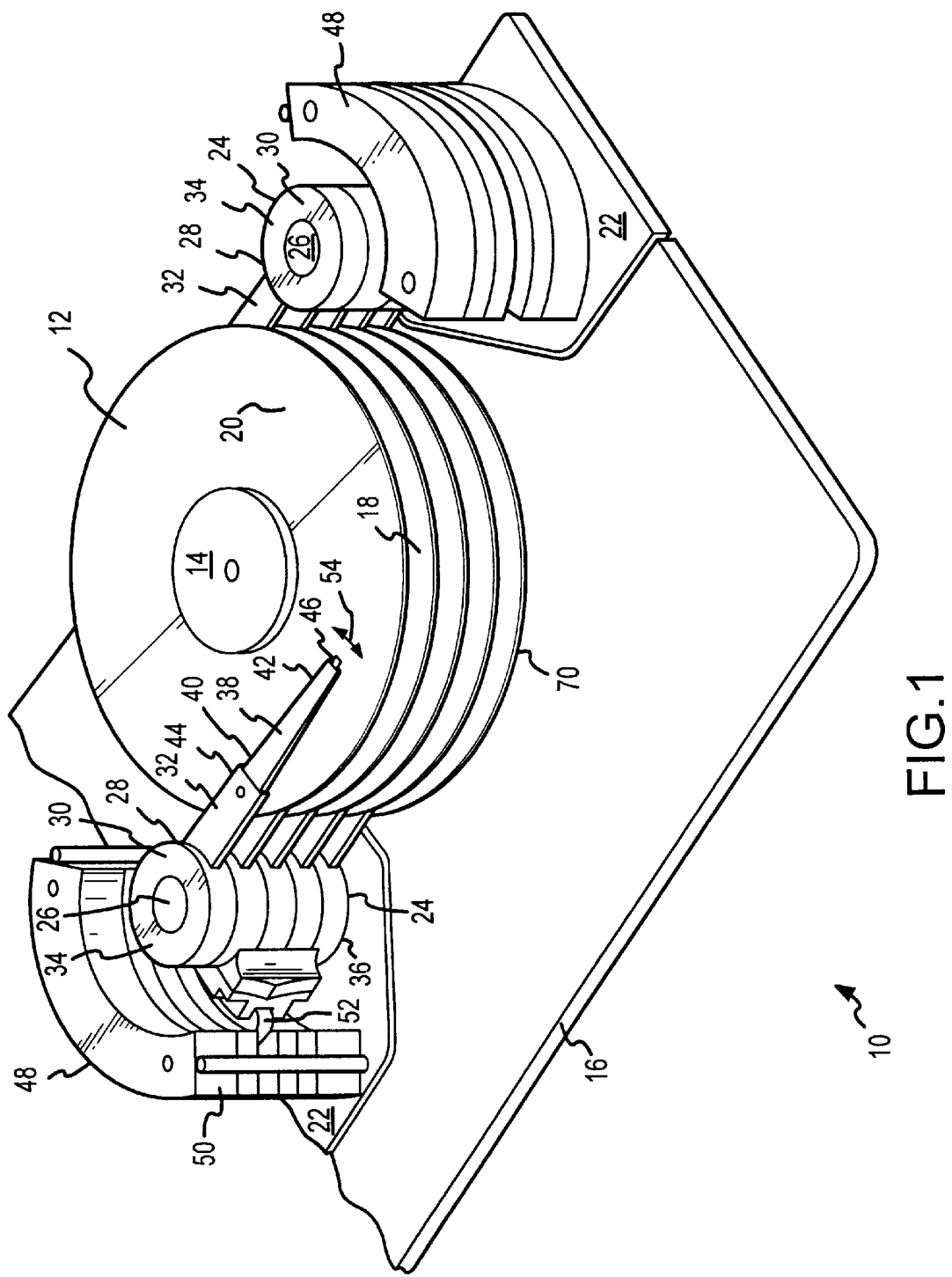
FIG. 1 is a perspective view of a disk drive system according to an embodiment of the invention.

FIG. 1 illustrates a disk drive system 10 for non-frictional, head stack-level loading and unloading of read/write heads from hard disks according to an embodiment of the present invention. A plurality of hard disks 12 are coupled to a spindle 14 which is rotatably mounted to chassis 16 and powered by a spindle motor (not shown in FIG. 1). The plurality of hard disks 12 are stacked in a parallel orientation with a gap 18 between adjacent hard disks such that the top surface 20 and bottom surface 70 of each hard disk 12 is accessible.

Adjacent to the stack of hard disks 12 are dual head stack assemblies 24 rotatably mounted about bearing cartridges 26 to head stack platforms 22. Each head stack assembly 24 is comprised of a plurality of actuator arms 28, each actuator arm having a bearing portion 30 and an arm portion 32. The bearing portion 30 further includes an upper bearing mating surface 34 and a lower bearing mating surface 36. The actuator arms 28 are vertically stacked about the bearing cartridge 30 such that the upper bearing mating surfaces 34 and lower bearing mating surfaces 36 of adjacent actuator arms 28 come into contact with each other. In preferred embodiments of the present invention, when the actuator arms 28 are properly mounted about the bearing cartridge 26, the bearing cartridge 26 retains the actuator arms 28 by applying compressive force perpendicular to the upper and lower bearing mating surfaces 34 and 36, and maintains the actuator arms 28 such that the arm portions 32 of each actuator arm 28 are substantially vertically aligned over each other. In alternative embodiments of the present invention, retaining means other than a bearing cartridge 26 may be used such as bolts, threaded cylindrical connectors, or swaged or interference fit connectors.

Each head stack assembly 24 further comprises a plurality of head suspension assemblies 38, at least one head suspension assembly for every actuator arm 28. Each head suspension assembly 38 includes an head suspension assembly proximal end 40 and an head suspension assembly distal end 42. An arm portion distal end 44 of the actuator arm 28 receivably retains the head suspension assembly proximal end 40 of corresponding head suspension assemblies 38. A read/write head 46 is coupled to the head suspension assembly distal end 42. The head stack assembly 24 is mounted in relation to the hard disks 12 such that the actuator arms 28 and corresponding head suspension assemblies 38 are positioned within the gap 18 between adjacent hard disks 12 and the read/write heads 46 are positioned in close proximity to the top surface 20 and bottom surface 70 of the hard disks 12.

The disk drive system 10 also includes radial voice coil motors 48 for positioning the head stack assemblies 24. Each radial voice coil motor 48 comprises a magnetic radial stator 50 fixedly coupled to head stack platform 22, and a radial rotor 52 fixedly coupled to the head stack assembly 24. The radial rotor 52 includes a coil (not shown in FIG. 1) such that when current flows through the coil, electromagnetic forces cause the radial rotor 52 and fixedly attached head stack assembly 24 to rotate about the bearing cartridge 26. This rotation causes the read/write heads 46 to move radially with respect to the hard disks 12 as indicated by arrow 54. In alternative embodiments of the present invention, the coil may be wrapped about the radial stator 50 and the radial rotor 52 may contain the magnetized material. In further alternative embodiments of the present invention, a stepper motor or other positioning system may be used in place of the radial voice coil motor 48.

Figure 2:
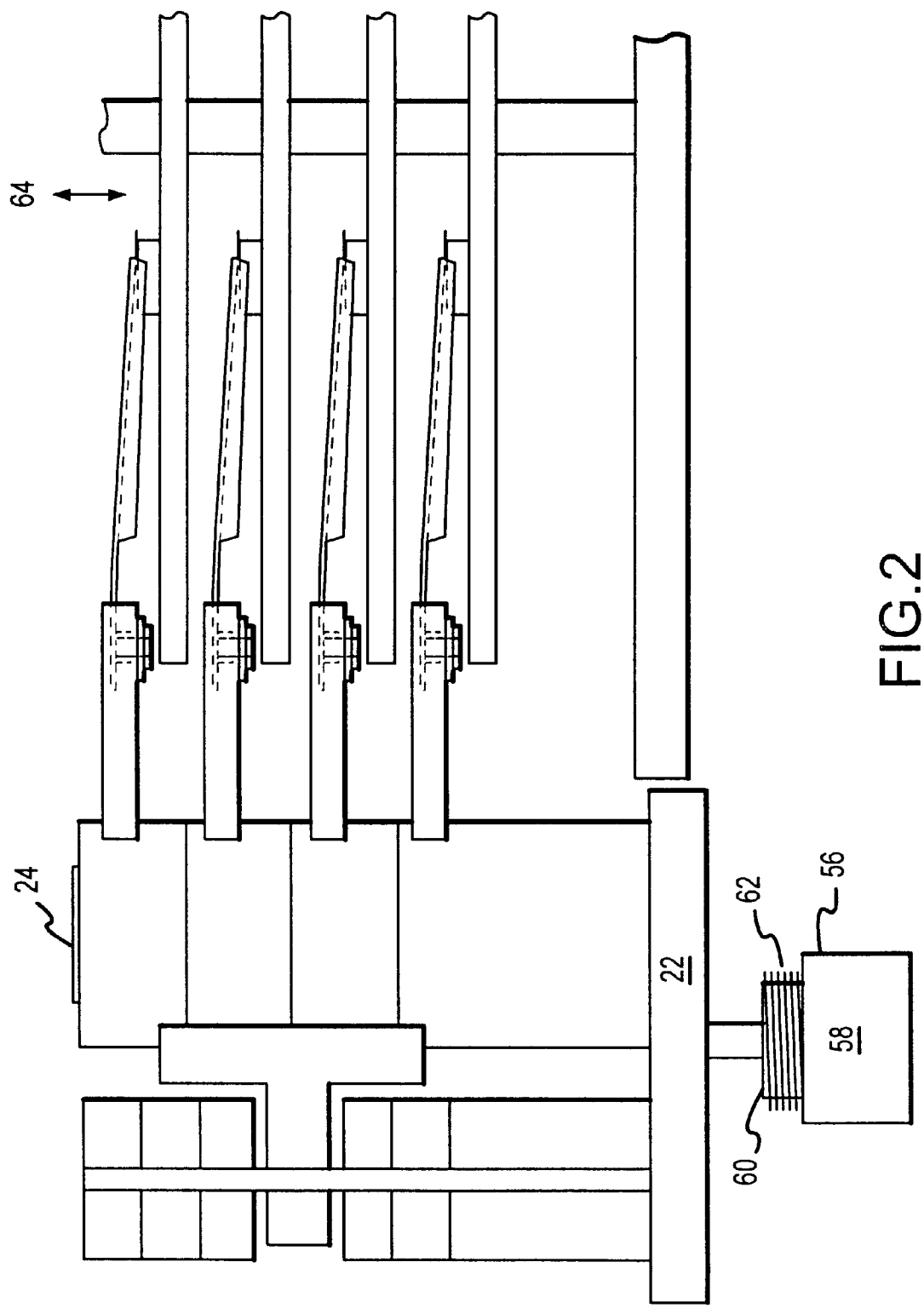
FIG. 2 is a side view of an actuator assembly in registration with a hard disk stack according to an embodiment of the invention.

FIG. 2 is a side view of an actuator assembly in registration with a hard disk stack according to an embodiment of the invention, further showing an axial voice coil motor 56 coupled to the platform 22. Each axial voice coil motor 56 comprises a fixed magnetic axial stator 58 and an axial rotor 60 fixedly coupled to the platform 22. The rotor 60 includes an axial coil 62 such that when current flows through the coil 62, electromagnetic forces cause the axial rotor 60, fixedly attached platform 22, and head stack assembly 24 to move axially with respect to the hard disks 12 in the direction indicated by arrow 64. In alternative embodiments of the present invention, the axial coil 62 may be wrapped about the axial stator 58 and the axial rotor 60 may contain the magnetized material. In further alternative embodiments of the present invention, a stepper motor or other positioning system may be used in place of the axial voice coil motor 56.

Referring again to FIG. 1, when the read/write heads 46 are to be unparked, the spindle motor (not shown in FIG. 1) causes spindle 14 and fixedly coupled hard disks 12 to rotate at an essentially constant velocity. Under program control, the coils (not shown in FIG. 1) on the radial rotors 52 may be energized, causing movement of the radial rotors 52 with respect to the radial stators 50. Movement of the radial rotors 52 causes the fixedly coupled head stack assemblies 24 to rotate about bearing cartridges 26, which also causes the read/write heads 46 to move radially with respect to the hard disks 12 as indicated by arrow 54 until the read/write heads 46 are positioned over a specific area on the hard disks 12, but above the flying height of the read/write heads 46.

Figure 3:
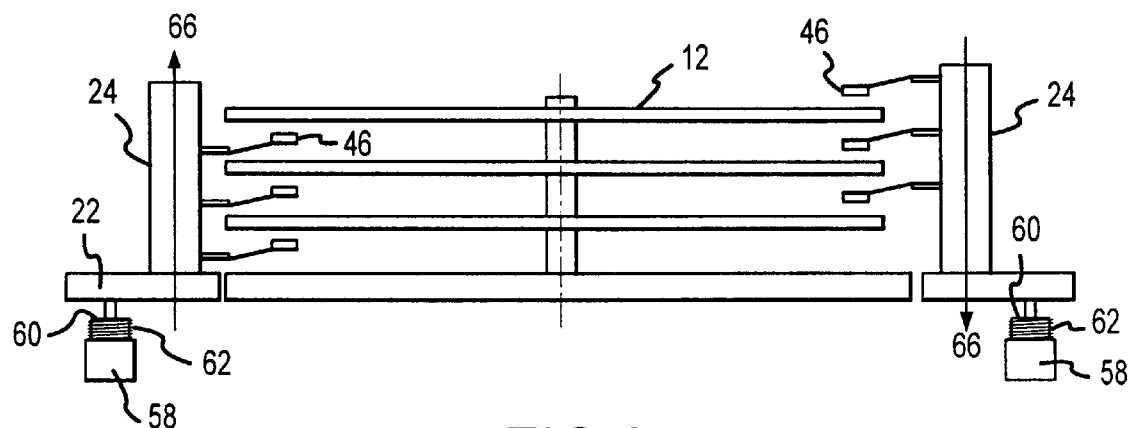
FIG. 3 is a side view of dual actuator assemblies with read/write heads being loaded onto a hard disk according to an embodiment of the invention.
Figure 4:
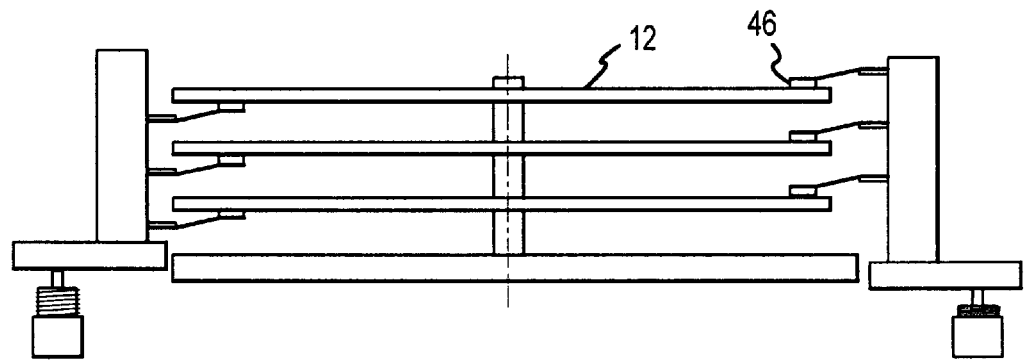
FIG. 4 is a side view of dual actuator assemblies with read/write heads loaded onto a hard disk according to an embodiment of the invention.

As illustrated in FIG. 3, the axial coils 62 wrapped about the axial rotors 60 are energized, causing movement of the axial rotors 60 with respect to the axial stators 58 in the direction indicated by arrow 66. Movement of the axial rotors 60 causes the platforms 22, fixedly coupled head stack assemblies 24, and read/write heads 46 to move axially with respect to the hard disks 12 as indicated by arrow 66 until the read/write heads 46 are positioned over a specific area on the hard disks 12 at approximately the flying height of the read/write heads 46. FIG. 4 illustrates read/write heads 46 properly loaded onto hard disks 12.

Figure 5:
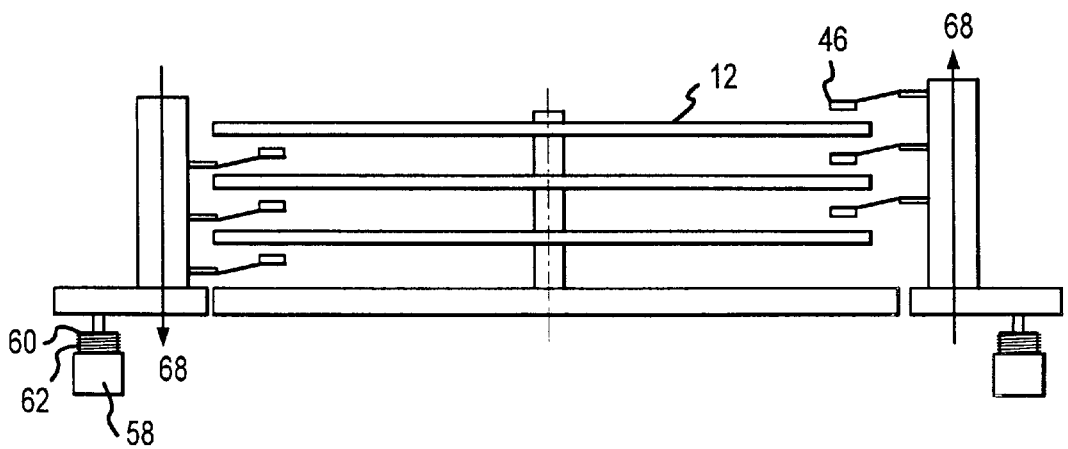
FIG. 5 is a side view of dual actuator assemblies with read/write heads being unloaded from a hard disk according to an embodiment of the invention.

As illustrated in FIG. 5, when the read/write heads 46 are to be unloaded from the hard disks 12, the axial coils 62 wrapped about the axial rotors 60 are energized in the reverse direction, causing movement of the axial rotors 60 with respect to the axial stators 58 in the direction indicated by arrow 68. Movement of the axial rotors 60 causes the platforms 22, fixedly coupled head stack assemblies 24, and read/write heads 46 to move axially with respect to the hard disks 12 as indicated by arrow 68 until the read/write heads 46 are positioned well above the flying height of the read/write heads 46. Radial movement of the head stack assemblies can then be initiated to move the read/write heads to a parking location off the outer diameter of the hard disks 12, or alternatively the read/write heads may be left suspended over the hard disks 12 as shown in FIG. 5.

It should be noted that although FIGS. 1–5 show a multiple-disk stack, in alternative embodiments of the present invention any number of hard disks, including a single hard disk, may be utilized. Furthermore, although FIGS. 1 and 3–5 illustrate dual head stack assemblies 24, in alternative embodiments three or more head stack assemblies 24 may be employed, or a single head stack assembly used in conjunction with single-sided hard disks may be employed. In addition, although FIGS. 1–5 illustrate rotatable head stack assemblies 24, in alternative embodiments of the present invention the head stack assemblies 24 may be linearly displaced to produce radial movement of the read/write heads 46 with respect to the hard disks 12. Similarly, although FIGS. 2–5 illustrate an axial voice coil motor 56 for producing axial movement of the read/write heads 46, in alternative embodiments of the present invention a stepper motor or other positioning system may be used in place of the axial voice coil motor 56.

Therefore, according to the foregoing description, preferred embodiments of the present invention provide a system and apparatus for non-frictional, head stack-level loading and unloading of read/write heads from the magnetic media that reduces the likelihood of improper pitch and roll of the read/write heads, thereby reducing the likelihood of read/write head contact with the magnetic media surfaces. The system and apparatus also reduces the likelihood of improper loading velocity, reducing the likelihood of read/write head contact with the magnetic media surfaces. The system and apparatus also eliminates the creation of wear debris detrimental to the integrity of the disk surfaces.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A disk drive read/write head parking system, the system comprising:
   at least one head stack assembly including a read/write head, the head stack assembly holding the read write head in proximity to at least one substantially flat magnetic media surface; and
   means for axially moving the at least one head stack assembly in relation to the at least one substantially flat magnetic media surface such that the read/write head is moved in a direction substantially normal to the at least one substantially flat magnetic media surface.

2. A disk drive system, the system comprising:
- at least one magnetic disk, each disk having at least one substantially flat magnetizable surface;
- at least one read/write head in proximity to each substantially flat magnetizable surface for reading data from and writing data to the magnetizable surface;
- at least one head stack assembly, each head stack assembly coupled to at least one read/write head for suspending the coupled at least one read/write head in proximity to a magnetizable surface;
- at least one head stack platform, each head stack platform coupled to at least one head stack assembly; and
- at least one axial positioning device, each axial positioning device coupled to at least one head stack platform for variably positioning the head stack platform and the coupled head stack assembly in a direction substantially normal to the at least one substantially flat magnetizable surface such that each read/write head coupled to the head stack assembly can be suspended at a flying height in relation to the magnetizable surface and at a second height greater than the flying height.

3. A disk drive system as recited in claim 2, wherein the axial positioning device comprises a voice coil motor.

4. A disk drive system as recited in claim 2, wherein the axial positioning device comprises a stepper motor.

5. A disk drive system as recited in claim 2, further including at least one radial positioning device for parking at least one read/write head coupled to at least one head stack assembly after the at least one read/write head is repositioned from the flying height to the second height in relation to the magnetizable surface, and for unparking the at least one read/write head prior to repositioning the at least one read/write head from the second height to the flying height in relation to the magnetizable surface.

6. A disk drive system as recited in claim 5, wherein the radial positioning device comprises a voice coil motor.

7. A disk drive system as recited in claim 5, wherein the at least one radial positioning device is coupled to the at least one head stack platform.

8. A disk drive system as recited in claim 2:
- wherein at least one magnetic disk has a first and second substantially flat magnetizable surface on opposite sides; and
- wherein at least one head stack assembly is coupled to at least one read/write head in proximity to the first magnetizable surface and at least one head stack assembly is coupled to at least one read/write head in proximity to the second magnetizable surface.

9. A disk drive head parking apparatus, the apparatus comprising:
- a head stack assembly platform;
- a head stack assembly coupled to the head stack platform for suspending at least one read/write head in proximity to at least one substantially flat magnetizable surface; and
- an axial positioning device coupled to the head stack platform for variably positioning the head stack platform and the coupled head stack assembly in a direction substantially normal to the at least one substantially flat magnetizable surface such that each read/write head coupled to the head stack assembly can be suspended at a flying height in relation to the magnetizable surface and at a second height greater than the flying height.

10. An apparatus as recited in claim 9, wherein the axial positioning device comprises a voice coil motor.

11. An apparatus as recited in claim 9, wherein the axial positioning device comprises a stepper motor.

12. An apparatus as recited in claim 9, further including a radial positioning device for parking at least one read/write head after the at least one read/write head is repositioned from the flying height to the second height in relation to the magnetizable surface, and for unparking the at least one read/write head prior to repositioning the at least one read/write head from the second height to the flying height in relation to the magnetizable surface.

13. An apparatus as recited in claim 12, wherein the radial positioning device is coupled to the head stack platform.

14. A disk drive head parking apparatus, the apparatus comprising:
- a plurality of parallel magnetic disks, each magnetic disk having a substantially flat magnetizable upper surface and a substantially flat magnetizable lower surface;
- a first head stack assembly including a bearing cartridge and a plurality of actuator arms coupled to the bearing cartridge, each actuator arm including a read/write head held in proximity to an upper surface of a corresponding magnetic disk by the first head stack assembly; and
- a first axial positioning device coupled to the first head stack assembly for moving the first head stack assembly in a direction substantially normal to the upper surfaces of the magnetic disks such that each read/write head of the first head stack assembly can be suspended at a flying height in relation to the upper surface of its corresponding magnetic disk and at a second height greater than the flying height.

15. A disk drive head parking apparatus as recited in claim 14 further comprising:
- a second head stack assembly including a bearing cartridge and plurality of actuator arms coupled to the bearing cartridge, each actuator arm including a read/write head held in proximity to a lower surface of a corresponding magnetic disk by the second head stack assembly; and
- a second axial positioning device coupled to the second head stack assembly for moving the second head stack assembly in a direction substantially normal to the lower surfaces of the magnetic disks such that each read/write head of the second head stack assembly can be suspended at a flying height in relation to the lower surface of its corresponding magnetic disk and at a second height greater than the flying height.

16. A disk drive head parking apparatus as recited in claim 15 further comprising:
- a first head stack platform, wherein the first head stack assembly is coupled to the first axial positioning device via the first head stack platform; and
- a second head stack platform, wherein the second head stack assembly is coupled to the second axial positioning device via the second head stack platform.

17. A disk drive head parking apparatus as recited in claim 16 wherein the first head stack assembly further comprises a first radial positioning device coupled to the first head stack platform for radially positioning the read/write heads of the first head stack assembly relative to the upper surfaces of the corresponding flat magnetic disks and wherein the second head stack assembly further comprises a second radial positioning device coupled to the second head stack platform for radially positioning the read/write heads of the second head stack assembly relative to the lower surfaces of the corresponding magnetic disks.

18. A disk drive head parking apparatus as recited in claim 14 further comprising a first head stack platform, and wherein the first head stack assembly is coupled to the first axial positioning device via the first head stack platform.

19. A disk drive head parking apparatus as recited in claim 18 wherein the first head stack assembly further comprises a first radial positioning device for radially positioning the read/write heads of the first head stack assembly relative to the upper surfaces of the corresponding flat magnetic disks.

20. A disk drive head parking apparatus as recited in claim 19 wherein the first radial positioning device is coupled to the first head stack platform.

* * * * *